United States Patent
Schwarz et al.

(10) Patent No.: US 11,003,180 B2
(45) Date of Patent: May 11, 2021

(54) COMMUNICATION SYSTEM AND MACHINE ARRANGEMENT

(71) Applicant: SICK AG, Waldkirch/Breisgau (DE)

(72) Inventors: Adrian Schwarz, Elzach (DE); Victor Kok Heng Phay, Singapore (SG)

(73) Assignee: SICK AG, Waldkirch/Breisgau (DE)

(*) Notice: Subject to any disclaimer, the term of this patent is extended or adjusted under 35 U.S.C. 154(b) by 469 days.

(21) Appl. No.: 15/912,878

(22) Filed: Mar. 6, 2018

(65) Prior Publication Data

US 2018/0259954 A1    Sep. 13, 2018

(30) Foreign Application Priority Data

Mar. 8, 2017 (EP) .................................... 17159840

(51) Int. Cl.
*G05D 3/00* (2006.01)
*G05D 1/00* (2006.01)
(Continued)

(52) U.S. Cl.
CPC ......... *G05D 1/0022* (2013.01); *G05D 1/0055* (2013.01); *G05D 1/028* (2013.01);
(Continued)

(58) Field of Classification Search
CPC .... G05D 1/0022; G05D 1/028; G05D 1/0055; G06K 7/10366
See application file for complete search history.

(56) References Cited

U.S. PATENT DOCUMENTS 9,202,093 B2 * 12/2015 Nummila ........... G06K 7/10366
9,313,559 B2 *  4/2016 Gravelle ........... G06K 19/0712
(Continued)

FOREIGN PATENT DOCUMENTS

CN    100474299 C    4/2009
CN    103492968 A    1/2014
(Continued)

OTHER PUBLICATIONS

Communication received from the European Patent Office dated May 30, 2018 corresponding to application No. 17159840.2-1220.
(Continued)

*Primary Examiner* — Adam M Alharbi
(74) *Attorney, Agent, or Firm* — Nath, Goldberg & Meyer; Jerald L. Meyer

(57) ABSTRACT

The invention relates to a communication system (1) having at least one first and one second transceiver (18, 38) for the wireless bidirectional transmission of signals between the transceivers (18, 38), wherein each transceiver (18, 38) has a transmission device (3) and a reception device (5). It is proposed that each transmission device (3) comprises an RFID transponder (18) that is configured to transmit the signals as transponder signals and that each reception device (5) comprises an RFID reading device (9) that is configured for receiving transmitted transponder signals. The invention further relates to a machine arrangement having at least one moving machine element and having such a communication system (1), wherein the second transceiver (38) is arranged at the moving machine element.

15 Claims, 2 Drawing Sheets

Figure 1:
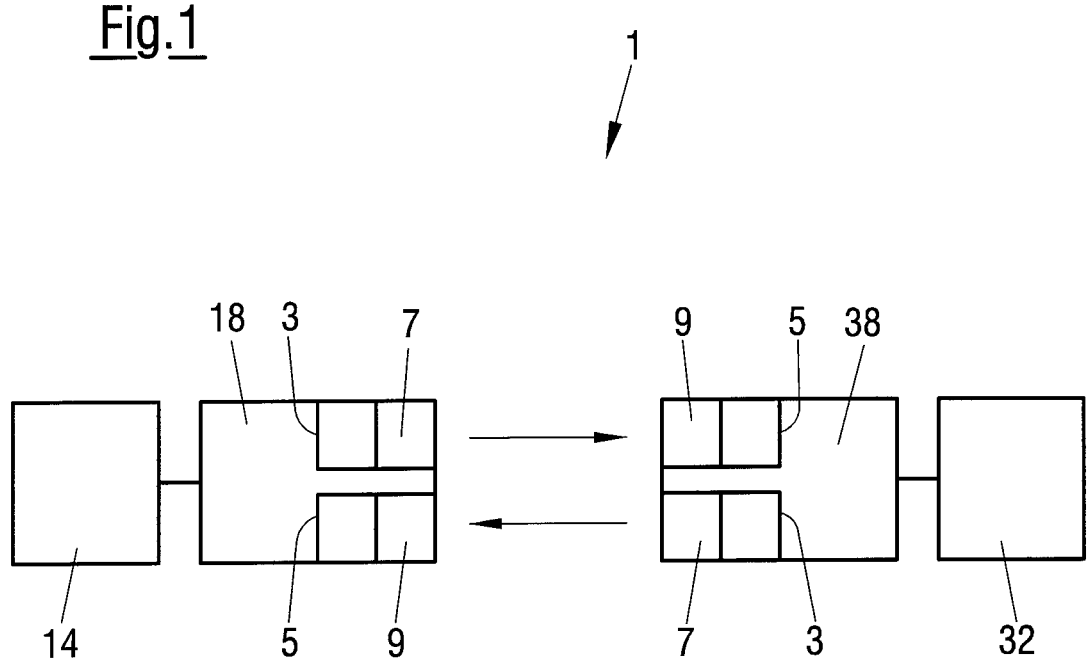

(51) Int. Cl.
  *H04B 5/00* (2006.01)
  *H04B 5/02* (2006.01)
  *G05D 1/02* (2020.01)
  *G06K 7/10* (2006.01)
  *G06K 19/07* (2006.01)

(52) U.S. Cl.
  CPC ..... *G06K 7/10366* (2013.01); *G06K 19/0723* (2013.01); *H04B 5/0056* (2013.01); *H04B 5/02* (2013.01); *G05D 2201/0212* (2013.01); *G05D 2201/0216* (2013.01)

(56) References Cited

U.S. PATENT DOCUMENTS

| | | | |
|---|---|---|---|
| 2013/0325210 A1 | 12/2013 | Palm | |
| 2017/0013483 A1* | 1/2017 | Rokhsaz | ............ G06K 7/10366 |
| 2019/0113912 A1* | 4/2019 | Olson | ................. G05D 1/0022 |

FOREIGN PATENT DOCUMENTS

| | | |
|---|---|---|
| CN | 105261224 A | 1/2016 |
| CN | 106251657 A | 12/2016 |
| EP | 1837781 A1 | 9/2007 |
| KR | 1020070082118 A | 8/2007 |

OTHER PUBLICATIONS

"Standard ECMA-340 Near Field Communication Interface and Protocol (NFCIP-1) 3rd edition (Jun. 2013)", ECMA International, Jun. 30, 2013, XP 055260355.
Jen-Hao Teng et al: "RFID-based autonomous mobile car", Industrial Informatics (INDIN), 2010 8th IEEE International Conference on, IEEE, Piscataway, NJ, USA, Jul. 13, 2010, pp. 417-422, XP031733699.
European Search Report dated Sep. 20, 2017, in corresponding European Patent Application No. 17159840.2.
Office Action dated May 12, 2020 issued in corresponding Chinese Application No. 201810189852.8.

\* cited by examiner

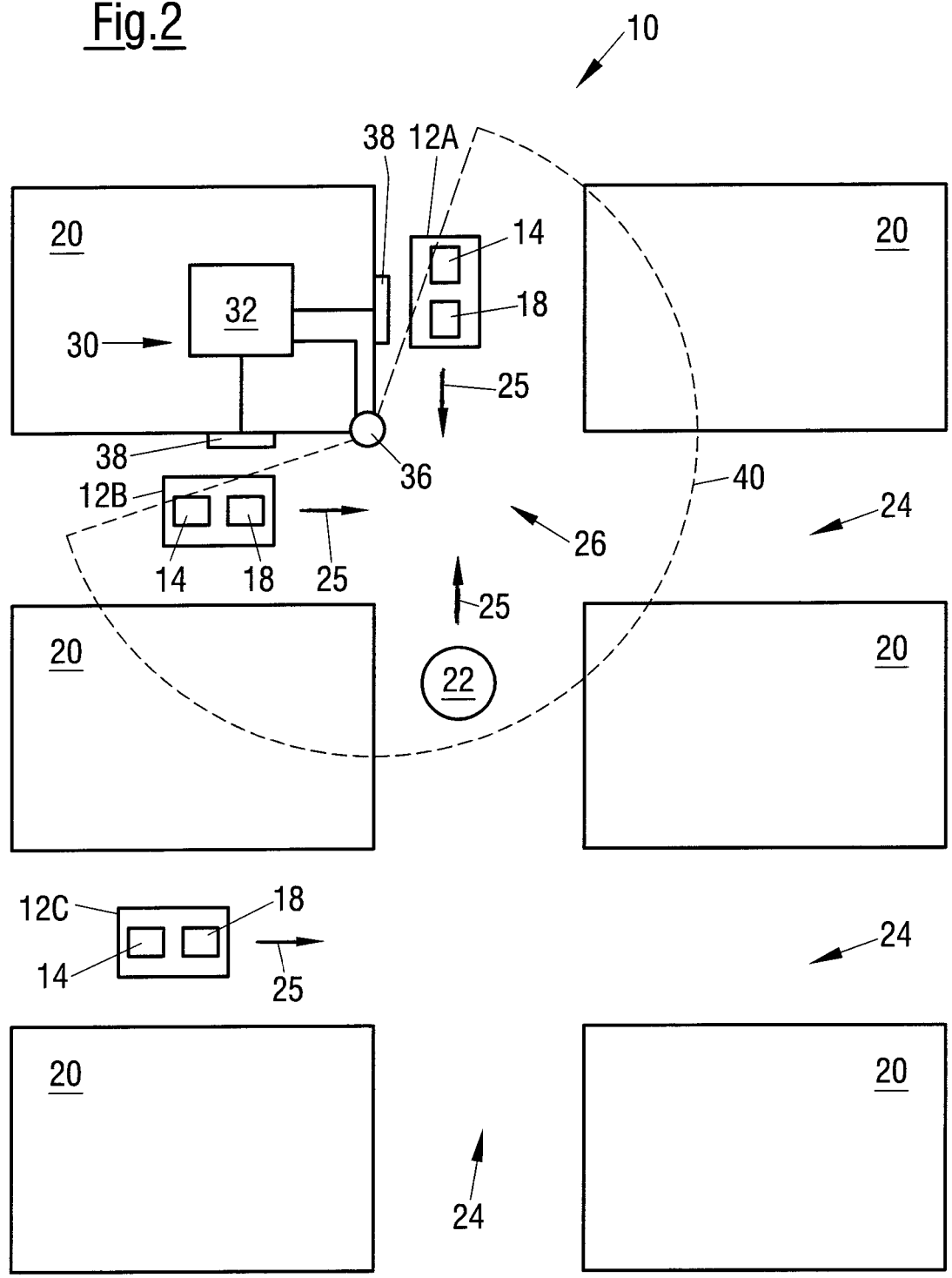

COMMUNICATION SYSTEM AND MACHINE ARRANGEMENT

The present invention relates to a communication system having at least one first transceiver and one second transceiver for the wireless bidirectional transmission of signals between the transceivers, wherein each transceiver has a transmission device and a reception device. The invention further relates to a machine arrangement having at least one moving machine element and such a communication system.

Such communication systems are used for different applications, in particular for industrial applications. An exemplary industrial application is the communication between a stationary device, for example a control or monitoring device, and one or more moving machine elements. Such moving machine elements can, for example, be vehicles of a driverless transport system. Driverless transport systems are used, for example, in industrial environments such as production floors, storage buildings, storage areas and/or other environments as well as also inside and outside of buildings to transport goods within this environment. A use of driverless transport systems for transporting persons in public and/or non-public transport networks is also possible.

Such a communication system can, for example, be used to transmit control commands from a stationary control device to a moving machine element, in particular to a driverless vehicle, on the one hand, and also to transmit signals, for instance reception acknowledgments or sensor signals from moving machine elements, to the control device, on the other hand.

Such a bidirectional communication is in particular required with safety related applications to ensure that transmitted commands were also received and/or implemented. An implementation of such a failsafe bidirectional communication known per se consists of the use of wireless LAN that designates a local radio network that is standardized, for example, as part of the IEEE-802.11 standard family. The "black channel" principle can be used so that a failsafe communication is ensured. For this purpose, a safety protocol is typically integrated between the safety application and the "non-safe" standard communication channel, said safety protocol corresponding to the safety level of the safety-directed system and recognizing and managing transmission errors of the underlying communication levels. This means that the "non-safe" transmission channel is continuously monitored for its integrity by a higher ranking "safe" protocol.

Such a communication by means of wireless LAN, however, in particular has a number of disadvantages in industrial environments. The energy consumption of wireless LAN systems is thus relatively high, which in particular restricts the operating time of a transceiver that is arranged at a mobile machine element and that cannot be supplied with operating current by cable due to limited energy storage capacities. The wirelessly transmitted signals are furthermore negatively influenced by the presence of metallic articles such as can frequently be found in industrial environments. This can admittedly be compensated by an increase of the transmission power, which is, however, in turn at the cost of the operating duration with a transceiver operated with an energy store. Finally, with safety-related applications, there are increased demands on the availability and interference security of a wireless communication system. Such safe communication systems on the basis of the wireless LAN standard are only available on the market with restrictions and/or are associated with high costs.

It is the object of the invention to provide a communication system that is inexpensive and can in particular also be used for safety-critical applications.

The object is satisfied by a communication system having the features of claim 1. Provision is made in accordance with the invention that each transmission device comprises an RFID transponder that is configured to transmit the signals as transponder signals and that each reception device comprises an RFID reading device that is configured for receiving transmitted transponder signals. Each transceiver accordingly comprises both an RFID transponder and an RFID reading device, with a transceiver not necessarily having to be configured as an integrated unit having an RFID transponder and an RFID reading device, but with the RFID transponders and the RID reading device also being able to be designed as respective separate units that can be arranged adjacent to one another or also spaced apart from one another.

In particular standardized RFID components can be used for the configuration of a communication system in accordance with the invention so that a wireless communication system can be implemented in a cost-favorable manner.

A respective transponder signal advantageously comprises a data set whose length and/or content is/are variable. Not only just simple fixed identifications can thus be transmitted as is the case, for example, with RFID systems for product marking or securing against theft, but alternatively or additionally different information, in particular information having a changing content, can also be transmitted.

In accordance with an advantageous embodiment, at least one of the transceivers is connected to an associated control device that is configured for producing and transmitting control codes to be transmitted to the transceiver and/or for detecting transmitted control codes from the transceiver, with a respective control code being transmitted as part of a transponder signal. It can, for example, be used to transmit control commands by means of the control code from a stationary control device to a mobile control device, for example to a control device of a driverless vehicle, wherein a transmission can naturally also be provided in the reverse direction. To this extent the term "control code" is also to be understood as a transmission of codes, in particular acknowledgment codes, as a response to a received control code and/or a transmission of sensor signals, status signals, or the like. For example, difference control commands can thus be transmitted to a receiving RFID reading device so that ultimately the transponder signals can be variable with respect to content and/or length.

In accordance with a further advantageous embodiment, a table of control commands is stored in the control device, with a respective control code comprising at least one of the stored control commands. Control commands for controlling a machine element controlled by the control device, in particular a driverless vehicle, can be stored in the table, for example, with the control commands being able to be implemented as very short codes that can e.g. have a length of a single byte or even of only a few bits (e.g. 4, 3, 2, or 1 bit(s)). The interpretation of the control commands then takes place with the aid of the table, with expediently both the transmitting transceiver and the receiving transceiver being connected to a respective control device in which a corresponding table is stored. Said table thus represents a look-up table or a kind of dictionary.

The control device is advantageously configured as a safety control device, with the control codes being transmitted by means of a safe transmission protocol. Such safe transmission protocols can serve to reduce or preclude the risk of a loss or of a change of data to be transmitted. The "black channel" principle can also be used here. Known safe transmission protocols are, for example, CIP (Common Industrial Protocol, e.g. CPF2 in accordance with the standard IEC 61158), ProfiSafe or IO-LinkSafety of PNO (PROFIBUS Nutzerorganisation e. V.) or EtherCAT FSoE (FSoE=Fail Safe over EtherCAT) in accordance with the standard IEC 61158 or IEC 61784-3-12.

The signals transmitted by at least one of the transceivers advantageously comprises an identifier that identifies this transceiver and/or a control device connected to this transceiver. It can thereby be ensured that, on the one hand, transponder signals are only transmitted to specific reception devices provided for reception and, on the other hand, only those transponder signals are received or taken into account that are received or taken into account by predefined transmission devices associated with the identifier.

In accordance with a further advantageous embodiment, the transceivers are adapted for a wireless communication in a frequency range from 30 to 500 kHz, in particular at a frequency of 125 kHz, and/or in a frequency range from 3 to 30 Hz, in particular at a frequency of 13.56 MHz. The signal transmission therefore takes place in the long wave range (LF range, 30 to 500 kHz) or in the short wave range (RF range, 3 to 30 MHz). RFID reading devices and RFID transponders for these frequency ranges can be obtained at particularly favorable prices and are particularly suitable for industrial environments in which the communication is impaired by high humidity and/or by the presence of metallic articles. The small data transmission rates and ranges in these frequency ranges can in particular be accepted or even offer particular advantages in the use in driverless transport systems. A reduced range can thus be used for a localization of driverless vehicles. It is, however, generally not precluded also to use RFID components that work in higher wavelength ranges, for example at 433 MHz (UHF range), 850 to 950 MHz, or higher.

Furthermore, a machine arrangement is provided having at least one first moving machine element and a communication system in accordance with any one of the above-described embodiments, with the second transceiver being arranged at the first moving machine element. The machine arrangement can comprise one or more transceivers arranged at the moving machine element.

The first transceiver can advantageously be arranged as stationary or at a second moving machine element. The machine arrangement can also comprise a plurality of first transceivers that can all be arranged as stationary, can all be arranged at the second or at further moving machine elements or some can be arranged as stationary and some further ones can be arranged at the second machine element or at further moving machine elements.

The first moving machine element is advantageously a driverless vehicle for transporting goods and/or persons.

The use of the communication system in accordance with the invention in such driverless transport systems offers special advantages. In a driverless transport system, a navigation of the driverless vehicles can take place in a manner known per se with the aid of control systems that are known per se, that are, for example, present in the vehicle and/or that can communicate with the vehicle via the communication system in accordance with the invention or via an additional communication link, with such a control system, on the one hand, being able to be connected to one or more sensors for the position determination of the vehicle and, on the other hand, being able to communicate with corresponding drive and steering systems of the vehicle to navigate the vehicle through the environment. The vehicles can be equipped with suitable monitoring sensors for avoiding collisions with persons, stationary obstacles, or other vehicles.

However, such vehicle-accompanying monitoring sensors are not sufficient in all situations since all the travel path zones cannot always be seen by the vehicle-accompanying monitoring sensors. There is in particular the risk at intersections in whose region buildings or vision-obstructing obstacles are present that vehicles or persons that cross the provided travel path of a driverless vehicle are not detected or are not detected in time. To reduce such risks, confusing travel path zones can be monitored by stationary monitoring devices, laser scanners for example. The stationary monitoring devices can, for example, be arranged at building corners or obstacle corners so that the arising of blind spots is largely avoided.

While such a stationary monitoring device detects an object, for example a person or another vehicle, in the monitored travel path zone, a control signal or control command can be transmitted to the driverless vehicle that influences the control system of the vehicle such that a collision is avoided.

When the stationary monitoring device detects an object in the travel path zone, it is, however, often difficult or impossible to distinguish whether the object is a person or a vehicle. If there is namely a potential risk of a human-vehicle collision, the vehicle may not drive into the travel path zone as long as the endangered person is not recognizable by the monitoring sensor of the vehicle. If, however, the detected object is a further vehicle and there is only the risk of a vehicle-vehicle collision, the vehicle may drive into the travel path zone when it is ensured that the other vehicle is stationary.

To enable such a distinction, provision can be made that the RFID transponder provided at the driverless vehicle is configured to transmit a transponder signal that at least comprises a vehicle-specific identifier, with the stationary monitoring device being connected to a control unit that is in turn connected to an RFID reading device that is configured for receiving a transponder signal transmitted by the RFID transponder. The control unit is configured to generate a control signal for the driverless vehicle on the basis of the received transponder signal. The control unit of the stationary monitoring device is adapted to link a detection signal generated by the sensor, by a laser scanner for example, to a received transponder signal. If, for instance, a corresponding transponder signal is simultaneously received from an object detected by the monitoring sensor, the monitoring device assumes that the detected object is a vehicle. If a corresponding transponder signal is, however, not received or if the zone from which the transponder signal was received does not coincide with the zone in which the sensor has detected the object, it is assumed that the object detected by the sensor is a person. The monitoring device or its control unit can transmit corresponding restrictive or permissive control commands on the basis of this identification or distinction, for example commands to stop or to evade, travel releases, steering commands and/or speed restrictions.

It is possible due to the vehicle-specific identification to identify an object detected by the sensor as a specific vehicle and to generate specific control signals intended for this vehicle and to transmit them to this vehicle by means of the communication system in accordance with the invention.

In comparison with other conceivable solutions, there is an advantage of the use of RFID components in accordance with the invention of a small power consumption for the communication with the monitoring device, which relieves the battery of driverless vehicles.

In accordance with an advantageous embodiment, the table comprises control commands to control the moving machine elements. Control commands can thus, for example, be transmitted as simple numerical codes (1, 2, 3, ... ) that are then converted in the RFID reading device of the driverless vehicle with the aid of the table into corresponding control commands for the vehicle (stop, drive, slow, fast, left, right, forward, backward, ... ).

It is understood that such simple numerical codes cannot only be used in connection with the control of a driverless vehicle, but can rather also very generally comprise any desired control commands in the form of simple numerical codes for controlling any desired other moving machine elements and in connection with one of the above-described embodiments of the communication system in accordance with the invention.

Further advantageous embodiments of the invention result from the dependent claims, from the description and from the drawings.

The invention will be described in the following with reference to embodiments and to the Figures.

FIG. 1 schematically shows a communication system in accordance with an embodiment of the invention; and FIG. 2 schematically shows a scene in which a driverless transport system is operated as an example of a machine arrangement in accordance with the invention having a communication system in accordance with the invention.

FIG. 1 shows a communication system 1 in accordance with an exemplary embodiment of the invention. The communication system 1 comprises a first transceiver 18 and a second transceiver 38 for a wireless bidirectional transmission of signals between the transceivers 18, 38, wherein each transceiver 18, 38 has a respective transmission device 3 and a respective reception device 5. Each transmission device 3 comprises an RFID transponder 7 that is configured to transmit the signals as transponder signals. Each reception device 5 comprises an RFID reading device 9 that is configured for receiving transmitted transponder signals. The respective RFID reading devices 9 can furthermore be adapted for generating magnetic alternating fields at a small range or radio frequency radio waves by which the RFID transponders 7 can be supplied with energy and/or can be excited for transmitting transponder signals.

The transceiver 18 is connected to a control device 14 and the transceiver 38 is connected to a control device 32. The control devices 14, 32 can be configured to produce and transmit control codes to be transmitted to the respective associated transceivers 18 and 38 respectively and/or to detect transmitted control codes from the respective associated transceiver 18 or 38, with a respective control code being transmitted as part of a transponder signal.

Respective mutually corresponding tables of control commands can be stored in the control devices 14, 38, with one or more control commands being able to be transmitted within a respective control code.

The use of such a communication system 1 in a driverless transport system as a special aspect of a machine arrangement in accordance with the invention will be described in the following with reference to FIG. 2.

An exemplary environment or scene 10 in which such a driverless transport system is operated with a communication system in accordance with FIG. 1 comprises a plurality of obstacles 1, for example machines, storage containers, buildings or building parts, between which a plurality of crossing vehicles 24 pass.

The driverless transport system comprises a plurality of driverless vehicles 12A to 12C that each comprise a control device or a vehicle control 14 for controlling the respective vehicle 12A to 12C through the scene. The vehicles 12A to 12C can furthermore have at least one respective monitoring sensor (not shown) connected to the vehicle control 14 for monitoring a vehicle environment. The vehicle control 14 is connected to a respective transceiver 18. The transceivers 18 cannot only transmit fixedly programmed identifiers, but can also transmit additional information or data they have had communicated by the vehicle control 14, for example command acknowledgments or status reports, e.g. the charge state of a battery.

The vehicles 12A to 12C move on the travel paths 24 in respective travel directions indicated by arrows 25 in FIG. 2.

A stationary monitoring device 30 that comprises a central control device or control unit 32 is provided at one of the obstacles 20. The monitoring device 30 has a sensor 36 that is connected to the control unit 32 and that is configured to detect the presence of objects in a travel path zone 26. The sensor 36 can, for example, be an optical sensor, in particular a laser scanner, and is preferably configured for a spatially resolved detection of objects. A detection zone 40 of the sensor 36 is indicated by a dashed line.

It is possible due to the monitoring device 30 also to monitor those zones of the travel paths 24 that are not visible or are only visible at a very late point in time by monitoring sensors arranged at the vehicles 12A to 12C. The vehicles 12A and 12B can thus, for example, not "see" directly in the situation shown in FIG. 2, but are both detected by the sensor 36.

The control unit 32 is furthermore connected to two transceivers 38 that are arranged at different sides of the obstacle 20 having the monitoring device 30 in the region of the respective travel paths 24. The transceiver 38 can as a rule receive demands directed to the transceivers 18 for the transmission of transponder signals and/or can transmit transponder signals and can receive transponder signals that are transmitted by the transceivers 18 of the vehicles 12A to 12C.

An exemplary operating scenario will be described in the following. The vehicles 12A and 12B as well as a person 22 approach the vehicle path zone 26 monitored by the monitoring device 25 in the directions indicated by arrows. As soon as they enter into the detection zone 40, they are detected as respective objects by the sensor 36. The sensor 36 or the control unit 32 associated therewith is, however, not able to distinguish whether the detected objects are vehicles or persons solely on the basis of the detection signals generated by the sensor 36.

However, as soon as vehicles move into the vicinity of a transceiver 38, one or more transceivers 38 can receive respective transponder signals from the transceivers 18 of the vehicles 12A, 12B, with the transponder signals comprising respective vehicle-specific identifiers that enable an identification of the individual vehicles 12A to 12C. Since the position of the transceivers 38 is known within the scene 10, the control unit 32 can associate the corresponding identifiers transmitted by the respective transceivers 18 with the reception signals of the sensor 36 going back to the vehicles 12A, 12B.

However, it is not possible to associate an identifier for the detection signal of the sensor 36 going back to the person 22 so that the control unit 32 has to assume on the basis of this missing identifier that the object 22 is a person, even if only a vehicle external to the system or another non-human obstacle were present at this position that does not transmit transponder signals.

Since a collision with such a non-identifiable object has to be prevented at all costs for safety reasons, the control unit 32 transmits control signals via the transceivers 38 to the vehicles 12A, 12B that comprise a command to stop immediately. These control commands can comprise the specific identifiers of the vehicles 12A, 12B so that the vehicle controls 14 only respond to these control signals when a respective identifier transmitted by the control signals corresponds to the identifier of the vehicle associated with the receiving vehicle control 14. The vehicle controls 14 can transmit acknowledgment signals that confirm the reception of the control signals and/or other control commands to the transceivers 38 or to the monitoring device 30 by means of the transceivers 18.

The vehicle 12C does not receive any control signal due to the limited range of the communication system. The vehicle 12C is not in the monitored vehicle path zone 26 and also does not approach it. The vehicle 12C can thus continue its path without influence.

If the sensor 36 determines that the person 22 is no longer in the vehicle path zone 26, the control unit 32 can subsequently transmit corresponding control commands via the transceivers 38 to the vehicles 32A, 38B that give it permission to continue its trip. To avoid a collision between the vehicles 12A, 12B, the control unit can determine an order in which the vehicles 12A, 12B can continue their trips.

There is accordingly a bidirectional RFID link between the vehicles 12A to 12C and the monitoring device 30 so that signals, in particular control signals and/or identifiers, can be exchanged in both directions.

In accordance with a modification, the transceivers 18 of the vehicles 12A to 12C can also communicate directly with one another, i.e. without a detour via the transceivers 38.

REFERENCE NUMERAL LIST 1 communication system
3 transmission device
5 reception device
7 RFID transponder
9 reading device
10 scene
12A-12C vehicle
14 control device, vehicle control
18, 38 transceiver
20 obstacle
22 person
24 travel path
25 direction of movement
26 travel path zone
30 monitoring device
32 control device, control unit
36 sensor
40 detection zone

The invention claimed is:

1. A driverless transportation system, comprising:
at least one first transceiver;
a driverless vehicle having at least one second transceiver, the at least one first transceiver being stationary with respect to the at least one second transceiver, the at least one first transceiver and the at least one second transceiver being adapted for wireless bidirectional transmission and reception of signals therebetween, and each of the at least one first transceiver and the at least one second transceiver comprising a transmission device and a reception device, wherein the transmission device comprises an RFID transponder configured to transmit the signals as transponder signals, and wherein the reception device comprises an RFID reading device configured to receive the transponder signals, the at least one second transceiver being configured to transmit a second transponder signal comprising a vehicle-specific identifier; and
a monitoring device for monitoring a travel path zone and detecting a presence of objects in the travel path zone, the monitoring device having a control unit, the control unit being in communication with the at least one first transceiver and being configured to identify a detected object as an individual vehicle based on the vehicle-specific identifier of the second transponder signal, the control unit being further configured to generate and transmit control signals, control codes and/or control commands specific to the individual vehicle, the control signals, control codes and/or control commands being transmitted by the at least one first transceiver.

2. The driverless transportation system in accordance with claim 1,
wherein each of the transponder signals comprises a data set with a variable length and/or content.

3. The driverless transportation system in accordance with claim 1,
wherein a table of control commands is stored in the control device; and
wherein each of the control codes comprises at least one of the control commands of the table of control commands stored in the control device.

4. The driverless transportation system in accordance with claim 1,
wherein the control unit is configured as a safety control device, the control codes being transmitted by means of a safe transmission protocol.

5. The driverless transportation system in accordance with claim 1,
wherein the signals transmitted by each said transmission device comprise an identifier that identifies the at least one first transceiver or the at least one second transceiver associated with the transmission device and/or a control device connected to the at least one first transceiver or the at least one second transceiver associated with the transmission device.

6. The driverless transportation system in accordance with claim 1,
wherein the at least one first transceiver and the at least one second transceiver are each adapted for wireless communication in a frequency range from 30 to 500 kHz.

7. The driverless transportation system in accordance with claim 6,
wherein the at least one first transceiver and the at least one second transceiver are each adapted for wireless communication at a frequency of 125 kHz.

8. The driverless transportation system in accordance with claim 1,
wherein the at least one first transceiver and the at least one second transceiver are each adapted for wireless communication in a frequency range from 3 to 30 MHz.

9. The driverless transportation system in accordance with claim 8,
wherein the at least one first transceiver and the at least one second transceiver are each adapted for wireless communication at a frequency of 13.56 MHz.

10. The driverless transportation system in accordance with claim 1,
wherein the at least one first transceiver and the at least one second transceiver are each adapted for wireless communication in a frequency range from 300 to 3000 MHz.

11. The driverless transportation communication system in accordance with claim 10, wherein the at least one first transceiver and the at least one second transceiver are each adapted for wireless communication at a frequency of 433 MHz.

12. The driverless transportation system in accordance with claim 10,
wherein the at least one first transceiver and the at least one second transceiver are each adapted for wireless communication in a frequency range from 850 to 950 MHz.

13. A machine arrangement comprising:
at least one first transceiver;
a moving machine element having at least one second transceiver, the at least one first transceiver being stationary with respect to the at least one second transceiver, the at least one first transceiver and the at least one second transceiver being adapted for wireless bidirectional transmission and reception of signals therebetween, and each of the at least one first transceiver and the at least one second transceiver comprising a transmission device and a reception device, wherein the transmission device comprises an RFID transponder configured to transmit the signals as transponder signals, and wherein the reception device comprises an RFID reading device configured to receive the transponder signals, the at least one second transceiver being configured to transmit a second transponder signal comprising a moving machine element-specific identifier; and
a monitoring device for monitoring a travel path zone and detecting a presence of objects in the travel path zone, the monitoring device having a control unit, the control unit being in communication with the at least one first transceiver and being configured to identify a detected object as an individual moving machine element based on the moving machine element-specific identifier of the second transponder signal, the control unit being further configured to generate and transmit control signals, control codes and/or control commands specific to the individual moving machine element, the control signals, control codes and/or control commands being transmitted by the at least one first transceiver.

14. The machine arrangement in accordance with claim 13,
wherein the moving machine element is a driverless vehicle for transporting goods and/or persons.

15. The machine arrangement in accordance with claim 13,
wherein a table of control commands is stored in the control device; and
wherein each of the control codes comprises at least one of the control commands of the table of control commands stored in the control device, and wherein the table of control commands comprises a table of control commands for controlling the moving machine element.

* * * * *